Oct. 2, 1928.
M. C. LEE
TIRE LOCKING DEVICE
Filed April 6, 1922
1,685,924
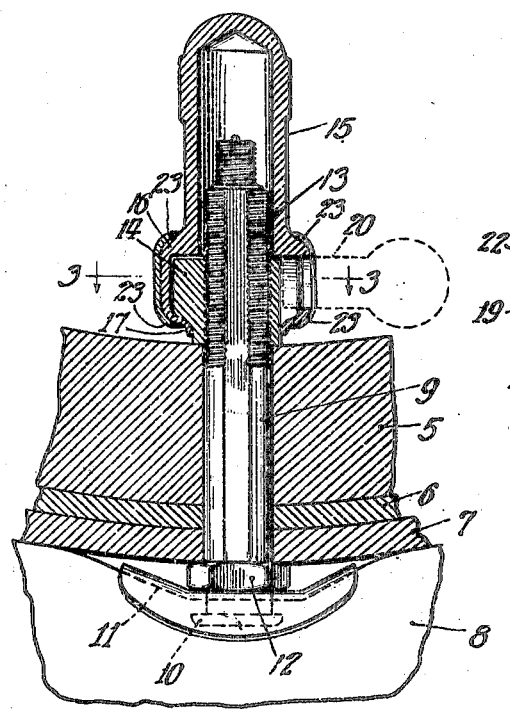
Inventor:
Morse C. Lee.

Patented Oct. 2, 1928.

1,685,924

UNITED STATES PATENT OFFICE.

MORSE C. LEE, OF CHICAGO, ILLINOIS.

TIRE-LOCKING DEVICE.

Application filed April 6, 1922, Serial No. 550,146. Renewed January 28, 1924.

My invention relates to locking devices for automobile tires and more particularly to a locking device that is secured to the valve stem of the tire.

Automobile tires customarily comprise an outer casing and an inner tube, the outer casing being mounted on a rim which is provided with an opening through which the valve stem, through which the inner tube is inflated, extends. Sometimes a felly of wood or other material is provided in addition to this rim, but whether this is provided or not, a valve stem is always provided extending through an opening in some part of the wheel, such as the rim. Tire carriers are usually provided with an opening through which this valve stem may extend.

It is a purpose of the invention to provide means on the valve stem for locking the tire to the wheel or tire carrier, said means not only locking the valve stem against removal through the opening in the wheel or rim member, but also preventing access to the valve so as to make it impossible to deflate the tire in the ordinary manner. It is practically impossible to remove the outer casing from the wheel, even though the same is a separate member from the inner tube, when the inner tube is inflated if the inner tube is locked to the wheel by means of the valve stem.

In the particular embodiment of the invention shown which is at the present time a preferred form, the valve stem is provided with a lock nut and with a dust cap, said dust cap being so made as to house the lock nut to prevent turning thereof except by some means that is key controlled, or in some other manner under the control of the person placing the dust cap on the valve stem. The locking nut is preferably so made that the same cannot be turned except by the use of a key or in some similar manner, and in the form shown the dust cap houses the locking nut and is free to rotate thereabout, except when a key is inserted through a suitable opening in the dust cap, said key entering suitable openings in the locking nut so as to cause the dust cap and locking nut to turn together, thus making it possible to unscrew the locking nut by turning the dust cap itself or by turning both the dust cap and locking nut by means of the key.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

In the drawings:

Fig. 1 is a view partly in section and partly in elevation of a valve stem and means for securing the same to an inner tube showing the same applied to a wheel, the wheel, rim and tire being shown as being broken away, my improved locking device being shown in section in position on the valve stem;

Fig. 2 is a view in side elevation of a dust cap embodying my improved locking means; and Fig. 3 is a section taken on the line 3—3 of Fig. 1.

Referring in detail to the drawings, in Fig. 1 is shown a portion of a wooden felly 5 having a fixed rim 6 and a demountable rim 7 mounted thereon. Mounted on the demountable rim 7 is a tire comprising the usual outer casing within which the inflatable inner tube 8 is confined. The inner tube 8 has a valve stem 9 provided thereon, the valve stem 9 being provided with a headed portion 10 at the inner end thereof on the inner face of the inner tube 8, and is provided with a bridge piece 11 between the inner tube 8 and the rim 7. The bridge piece 11 is of customary construction and is held in position by means of the nut 12, said nut also serving to clamp the inner tube 8 between the head 10 and the bridge piece 11.

The valve stem 9 is provided with the usual threaded portion 13 upon which the locking nut 14 is adapted to be screwed until the same engages with the inner face of the felly 5, thus clamping the valve member and the inner tube 8, and as a result, the outer casing in position on the wheel or other member through which the valve stem extends, as the case may be.

It will be seen from Fig. 3 that the member 14 is made similar in outline and that the valve is provided with a dust cap 15 which is provided with an outwardly struck annular portion 16 which extends around the nut 14.

It will also be seen that the member 15 is necked in as at 17 in any suitable manner so as to completely house the member 14, thus preventing access to the member 14 with a wrench or other means. The nut 14 is provided with a plurality of recesses or slots 18 and the dust cap 15 is provided with an irregular slot or opening 19 through which a key of the proper form may be inserted, said key being shown in dotted lines at 20. The key 20 is adapted to enter one of the recesses 18, and it will be evident that ordinarily when no key is inserted through the slot 19 to engage in a recess 18 that the dust cap is free to rotate around the member 14, but that when the key is inserted these two parts turn together and the nut may be removed by turning the dust cap by means of the knurled portion 21 or by turning the dust cap and nut by means of the key 20. In order to prevent the entrance of dust into the valve mechanism through the slot 19 an annular dust cover 22 is provided, said member 22 being formed so as to have portions 23 extending around the shoulders at the enlarged portion 16 of the dust cap so as to guide the movement thereof permitting rotation of the member 22 around the member 15. A gap is provided at 24 in the member 22 so that when this gap is turned in alignment with the slot 19 the key 20 can be inserted in position to operate the dust cap to remove the same.

It will be evident that it is also necessary to use the key for placing the dust cap in position, thus making it necessary to have the key to assemble the device in the position shown in Fig. 1. It will be evident that when the dust cap is in position and locked in this position by means of the nut 14 that access to the valve to deflate the tire cannot be obtained. It will also be evident that due to the fact that the dust cap ordinarily turns on the nut that the nut cannot ordinarily be unscrewed except by the use of the key.

It will be further noted that even if the wedging members or other means by which the rim is held in place are removed in an effort to steal the tire that the tire cannot be removed from the rim due to the fact that the inflatable member within the same is locked to the wheel or other member through which the valve stem extends, and that the inflatable member cannot be deflated due to the fact that the dust cap is locked in position. If the inflatable member is in inflated condition it is impossible to remove the outer casing or the inner tube from the rim when the valve stem is in position in the valve opening and locked against removal therefrom.

Having thus described my invention, what I desire to claim and secure by U. S. Letters Patent is:

1. The combination with a tire having a valve stem thereon, of a member having an opening therein through which said valve stem is adapted to be projected, means for clamping said valve stem to said member movable into and out of clamping position by rotation thereof, a housing for said means mounted to normally rotate freely about said means, said means and said housing being adapted to be engaged by a key whereby said means and housing are adapted to rotate together.

2. The combination with a tire having a valve stem thereon, of a nut having screw threaded engagement with said valve stem and a dust cap housing said nut to prevent access thereto, said dust cap being normally freely rotatable independently of said nut, said nut having recesses therein and said dust cap having an opening through which a member is adapted to be passed into engagement with one of said recesses, whereupon turning of said dust cap will rotate said nut.

3. The combination with a tire having a valve stem thereon, of a nut having screw threaded engagement with said valve stem and a dust cap housing said nut to prevent access thereto, said dust cap being normally freely rotatable independently of said nut, said nut having recesses therein and said dust cap having an opening through which a member is adapted to be passed into engagement with one of said recesses, whereupon turning of said dust cap will rotate said nut and means for closing the opening in said dust cap.

In witness whereof, I hereunto subscribe my name this 15th day of March, A. D. 1922.

MORSE C. LEE.